United States Patent [19]
Armell

[11] 4,438,938
[45] Mar. 27, 1984

[54] SEAL FOR INCORPORATION IN HIGH PRESSURE LEAK TESTING TOOL

[75] Inventor: Richard A. Armell, Montrose, Scotland

[73] Assignees: Boc-Nowsco Limited; Drexel Equipment Limited, both of London, England

[21] Appl. No.: 465,803

[22] Filed: Feb. 11, 1983

[30] Foreign Application Priority Data

Feb. 12, 1982 [GB] United Kingdom ................. 8204252

[51] Int. Cl.³ ............................................. F16J 15/20
[52] U.S. Cl. ...................................... 277/230; 277/1; 277/188 A; 277/212 C
[58] Field of Search ............ 277/1, 152, 153, 277–230, 277/DIG. 6, 212 C, 188 A

[56] References Cited

U.S. PATENT DOCUMENTS

| 609,029 | 8/1898 | Karns | 277/212 C X |
|---|---|---|---|
| 1,520,704 | 12/1924 | Farmer | 277/212 C |
| 1,604,269 | 10/1926 | Farmer | 277/212 C |
| 2,420,226 | 5/1947 | Claus | 277/227 X |
| 2,446,224 | 8/1948 | Frisby et al. | 309/44 |
| 2,797,758 | 7/1957 | Showalter | 166/204 |
| 2,930,643 | 3/1960 | Mastrobattista et al. | 277/153 |
| 2,998,721 | 9/1961 | Gawlik | 73/49.1 |
| 3,094,337 | 6/1963 | Pippert et al. | 277/188 |
| 3,106,407 | 10/1963 | Mattingly | 277/188 |
| 3,583,712 | 6/1971 | Weinheim et al. | 277/214 |
| 4,219,204 | 8/1980 | Pippert | 277/152 X |

FOREIGN PATENT DOCUMENTS

| 512752 | 5/1955 | Canada | 277/153 |
|---|---|---|---|
| 2358802 | 5/1975 | Fed. Rep. of Germany | |
| 358294 | 12/1961 | Switzerland | 277/212 C |
| 329401 | 5/1930 | United Kingdom | |
| 826214 | 12/1959 | United Kingdom | 277/188 A |
| 953916 | 4/1964 | United Kingdom | 277/212 C |
| 1161529 | 8/1969 | United Kingdom | 277/188 A |
| 2020759 | 11/1979 | United Kingdom | 277/230 |

Primary Examiner—Robert S. Ward
Attorney, Agent, or Firm—Leydig, Voit, Osann, Mayer & Holt, Ltd.

[57] ABSTRACT

A rubber seal includes a bush (10) of natural rubber and end cups (12) each incorporating a multiplicity of synthetic fabric layers. The end cups (12) are rubberized and are fully integrally moulded into the main portion of the bush so that the final hollow cylindrical member has plane end faces and a smooth cylindrical peripheral surface a part of which is defined by an outer one of the layers of fabric.

9 Claims, 8 Drawing Figures

SEAL FOR INCORPORATION IN HIGH PRESSURE LEAK TESTING TOOL

BACKGROUND OF THE INVENTION

1. Field of the Invention

This invention relates to rubber articles intended to be capable of resisting high pressure and cyclic operation under such high pressure.

2. Description of the Prior Art

The testing of pipelines and in particular the joints thereof is conventionally effected by applying a high pressure to a section of a pipe and then monitoring any drop in the applied pressure which would indicate leakage. It has also been proposed to limit the length of pipe tested at any given time by inserting an obturating tool into the pipeline and then activating at least two seals to isolate the given section and once again to monitor the pressure drop, if any. Such seals are an essential feature of any obturating tool and many such tools have been proposed in the patent literature. However, most such tools have not been employed practically since a simple block of rubber which is either inflated to cause sealing contact with the pipe wall or is subjected to a compression force so that it expands by the action of the poisson effect is liable to be unsatisfactory in practice inter alia for the following reasons.

The very high pressures which are inevitably employed tend to cause the seals to perform as a vey viscous fluid and an extrusion effect is produced by these high pressures.

It is also desirable with obturating tools of the kind in question that they should be capable of being repositioned at successive locations along a pipe line and to do this it is necessary to release the pressure in order that the obturating tool can be moved. Ideally it is possible to complete each test over a time period of approximately one minute and this substantial benefit will be lost if the sealing rubbers fail to react rapidly both to the reduction in pressure and to the increase in pressure just before the seals are to be activated. It follows that the basic rubber must have a rapid response to changes in pressure and must have a poor "memory" so that the rubber does not readily set in a given configuration.

It has already been proposed to construct a piston ring of rubber with layers of absorbent fabric adhered to and covering parts of the external surface in U.S. Pat. No. 3,583,712, but as incorporated in a groove of a piston the piston ring is not subjected to multiple compression cycles involving pressures of the order of 6000–12000 lb/sq. in. (400–800 kg/sq.cm.).

Extrusion of the material of the ring cannot take place because the end surfaces are confined by rigid rings of the L-section. Used alone, the proposed piston ring could not withstand the extreme pressures and cyclic conditions encountered by seals of the obturating tools under consideration, that is as disclosed in co-pending British Patent Application 80.25902 (Publication No. 2,056,091) and other tools involving very high pressure conditions for the seals.

SUMMARY OF THE INVENTION

According to the present invention there is provided a seal comprising a central cylindrical bush of a rubber capable of reverting to the unloaded shape after a multiplicity of high compression loading cycles, and a multiplicity of rubberized fabric layers embedded within the bush at each end surface thereof and continuing around the respective transition edges to extend along a proportion of the cylindrical periphery of the bush.

Further according to the present invention there is provided a seal comprising a hollow cylindrical rubber member having a poor memory and multiple fabric layers embedded in the rubber of the cylindrical member, each layer being shaped to conform with a part of one end face of the cylindrical member and a part of the outer cylindrical periphery contiguous with said end face, the rubber and the fabric layers being of materials such that they can withstand multiple high compression cycles without permanent deformation and with a rapid return to the relaxed condition after each loading.

Still further according to the present invention there is provided a seal comprising a central, cylindrical, bush of rubber having a durometer hardness in the range of from 60–65, a first end cup of multiple layers of a close woven nylon fabric rubberized with the same rubber as that of the bush, and a second end cup of multiple layers of a close nylon fabric rubberized with the same rubber as that of the bush, both said ends cups, being integrally incorporated with the bush by moulding so that the end faces of the bush each have one said fabric layer in the surface thereof and the peripheral surface of the bush has end portions with a fabric layer of respective one of the end cups in the surface thereof, the seal, having, overall a hollow cylindrical shape with plane ends and a smooth peripheral surface, and having operational characteristics such that it can be compressed axially to high loadings without extrusion and so that on release of the compression force it returns rapidly to its relaxed condition.

BRIEF DESCRIPTION OF THE DRAWINGS

A high pressure rubber sealing member embodying the invention will now be described, by way of example only, with reference to the accompanying diagrammatic drawings in which.

Figure 3:
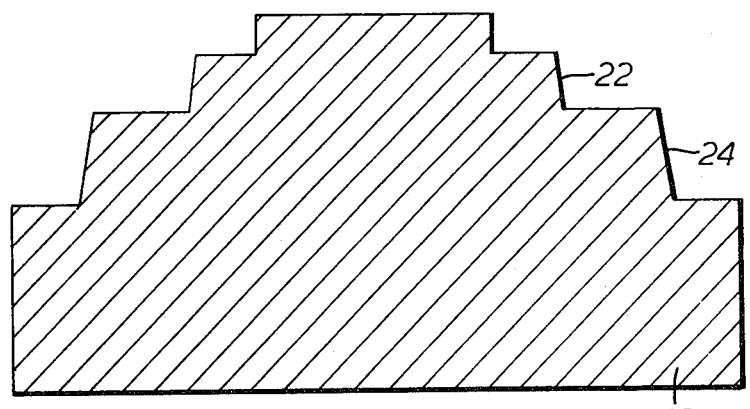
FIG. 3 is a section through another part of the mould for use in making the anti-extrusion cup.
Figure 3A:
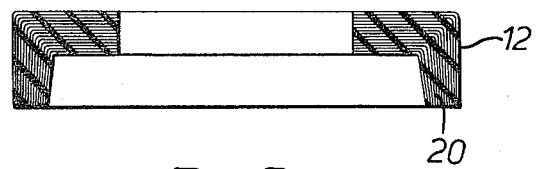
FIG. 3A is a longitudinal section of the anti-extrusion cup.
Figure 4:
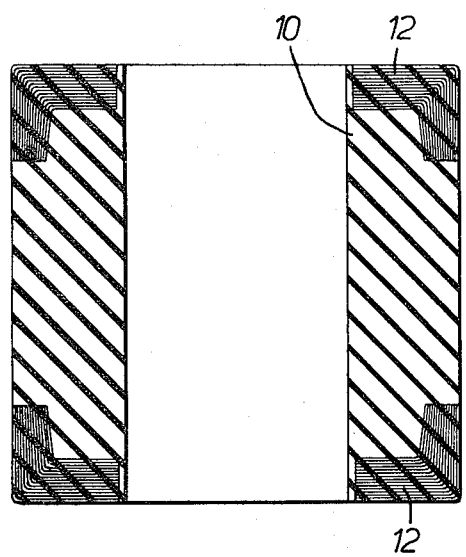
FIG. 4 is a section of a completed seal embodying the invention.
Figure 7:
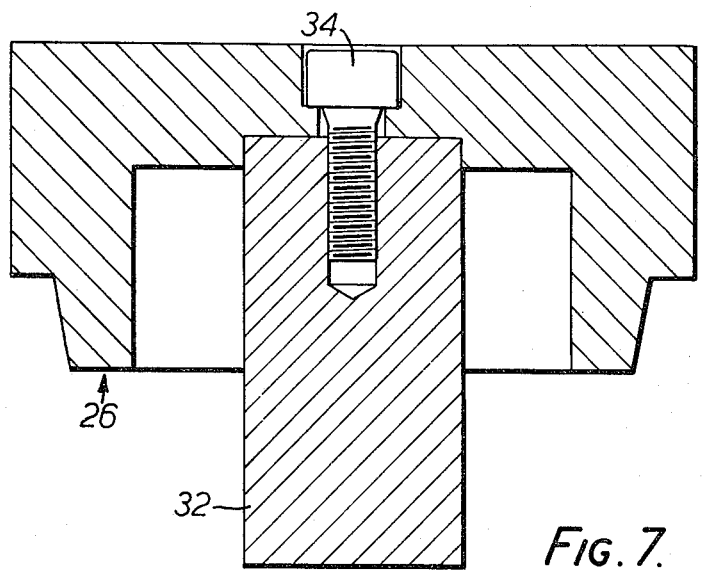
FIG. 7 is a longitudinal section of a male part of the mould of FIG. 5.
Figure 5:
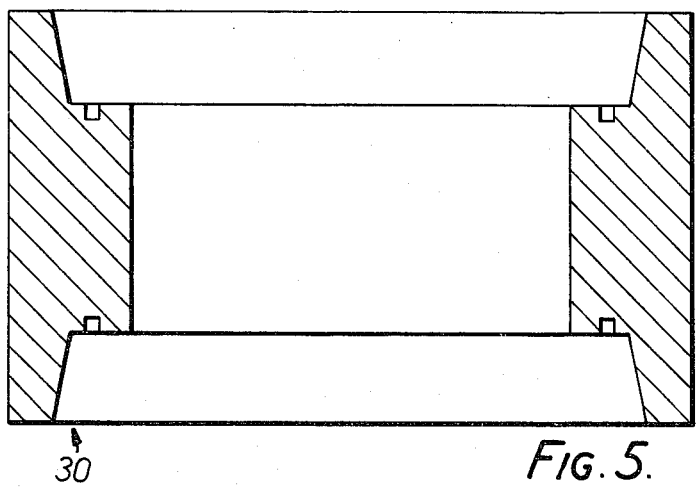
FIG. 5 is a section showing part of the seal mould for making the seal of FIG. 4.
Figure 6:
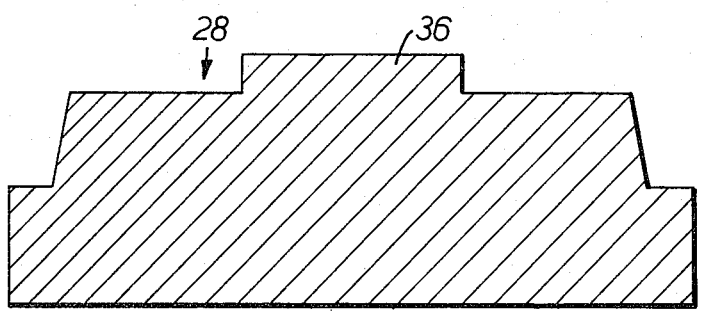
FIG. 6 is a longitudinal section of another part of the seal mould.

As will be apparent from FIG. 4 a sealing rubber in accordance with the invention comprises a rubber bush or other hollow cylindrical member 10 made of vulcanized natural rubber having a durometer hardness range of 60–65 and two cups 12 of laminate rubberised fabric shaped to a dished form as is clearly apparent in FIGS. 3A and 4. The end cups are concentric with the bush.

The rubberised fabric is preferably made of a nylon weave known as four weave 427/62 and each end cup 12 has from 6 to 12 layers of rubberised fabric; more generally the fabric is preferably a close weave of synthetic resin material and the layers are bonded together by a natural rubber having the same characteristics as the rubber used for the bush 10. The rubber of the bush is preferably identical to that of the rubberized fabric.

Figure 1:
FIG. 1 is a side elevation of a disc of laminated fabric intended to form an anti-extrusion cup of a completed seal.

As will be apparent from FIG. 1, the end cups 12 are initially made as discs 13 with a central hole 14 and the final cup form is imparted by the mould tools 16, 18 of FIGS. 3 and 4, by placing the multiple fabric layers in the heated mould tools, and holding the two tools together for a sufficient time to effect the required deformation.

For a seal intended to operate with a comparatively small pipe with outer diameter of 3⅝" each disc 13 will have an initial outer diameter of 5⅛" to allow for formation of the periphery 20 of the cup. To enable the periphery 20 to be formed readily, radial score lines (not shown) are formed in the disc on one face thereof. With a disc 5/16" thick the score lines will be radial and spaced at the central hole 14 at spacings of 3/32". These dimensions are however, only typical of this particular seal size. For larger sizes the peripheral portion will normally be proportionately deeper and the score lines at greater spacings.

The mould halves 21, 23 forming the cup for the disc are generally conventional bit it will be particularly noticed that the draw on the peripheral surfaces 22, 24 is pronounced; preferably the angle lies between 5° and 10°.

FIG. 4 shows the completed seal and as will be apparent includes two anti-extrusion end cups 12, and the central core or bush 10 is of a rubber which has high strength and a poor "memory" since this material must be capable of taking up alternate configurations in rapid succession. It is also important that over a large number of cycles the rubber should continue rapidly to respond to increases and decreases in applied pressure and to resist abrasion. Tests so far carried out indicate an almost infinite life compared with very short lives for conventional seals. It will be apparent from FIG. 4 that the fabric layers at each end cover a major proportion of the end surface of the bush 10 and a minor proportion of the overall length of the peripheral surface of the bush. The overall shape of the end cups conforms with the general shape of the bush 10 so that a hollow cylindrical member with a smooth cylindrical peripheral surface and plane end surfaces is produced.

Figure 2:
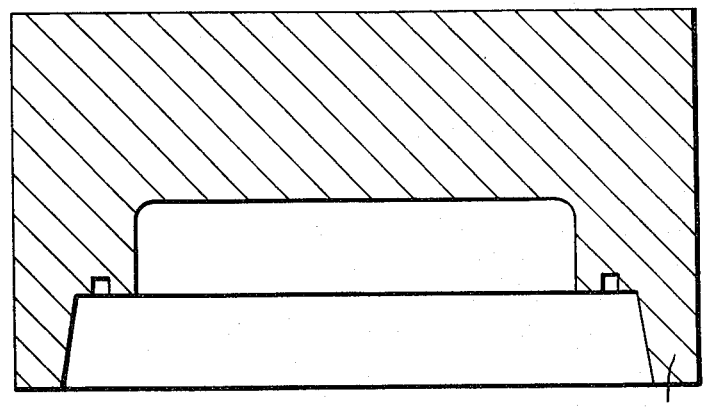
FIG. 2 is a section through a cup mould for making the cup of FIG. 1.

A mould tool suitable for forming the final seal is illustrated in the remaining Figures and is again generally conventional. This mould comprises upper and lower parts 26, 28 and an intermediate part 30. The upper part 26 carries a central core 32 secured to the main portion by a bolt 34. As for the mould of FIG. 2 and 3 substantial draft angles are provided. When in their operative locations the lower end of the core 32 will accurately abut a central shallow projection 36 of the lower mould part 28.

In operation both moulds will be heated to assist respectively in the shaping of the cups 12 and the integral bonding of the cups and the bush 10. The moulding of the final bush 10 is effected by placing the pre-formed end cups 20 in the mould tools 26, 28 and then bringing these two tools together. The closed mould then receives a pre-calculated quantity of uncured rubber and is then left in the mould for a sufficient time to vulcanize, after which the mould tools are separated and the finished seal is removed.

The seals may be used in any known high-pressure leak detection apparatus but have particular application to obturating tools which are required to withstand high cyclic pressures. It has been found that they will withstand 500 or more cycles of high pressure and atmospheric pressure, a very rapid response to release of pressure being achieved so that the seal returns almost immediately to its relaxed condition. This is important as the tests carried out by the leakage detection tools need last only 60 seconds and the tool can then be rapidly moved to the next leak detection site in the pipe being tested. Any delay in recovery of the seals will delay movement of the tool.

I claim:
1. A high-pressure seal comprising
  a hollow cylindrical member of a rubber having a poor memory, and
  multiple, pre-rubberized, woven fabric layers arranged as a nested stack and embedded in the rubber of the cylindrical member,
  each said layer being shaped to conform both with a peripheral part of one end face of the hollow cylindrical member and with an axially extending part of the outer cylindrical periphery contiguous with said end face so that each layer is continuous at the junction between the portion thereof contiguous with the end face and the portion contiguous with the cylindrical periphery, the rubber and the rubberized fabric layers being of materials such that they can withstand multiple high compression loading cycles without permanent deformation, substantially without extrusion and with a rapid return to the relaxed condition after each loading cycle.
2. A seal according to claim 1 wherein the bush is of natural rubber.
3. A seal according to claim 1, wherein the hollow cylindrical member is of natural rubber.
4. A seal according to claim 1 wherein the rubber embedding the fabric layers is the same as that of the hollow cylindrical member.
5. A seal according to claim 1 wherein there are from 6 to 12 fabric layers at each end of the seal.
6. A seal according to claim 1 wherein the fabric is selected from a nylon of suitable characteristics.
7. A seal according to claim 1 wherein the rubber of the bush is vulcanized natural rubber having a durometer hardness in the range of from 60–65.
8. A seal according to claim 1, wherein the rubber of the hollow cylindrical member is a vulcanized natural rubber having a durometer hardness in the range of from 60–65.
9. A high-pressure seal comprising a central, cylindrical, bush of rubber having a durometer hardness in the range of from 60–65,
  a first end cup of nested multiple layers of a close woven nylon fabric pre-rubberized with the same rubber as that of the bush, the individual fabric layers all traversing the junction between the respective end face and the peripheral surface of the bush, and
  a second end cup of nested multiple layers of a close woven nylon fabric pre-rubberized with the same rubber as that of the bush, the individual fabric layers all traversing the junction between the respective end face and the peripheral surface of the bush,
  both said end cups being integrally incorporated with the bush by moulding so that the end faces of the bush each having one said fabric layer in the surface thereof and the peripheral surface of the bush has end portions with a fabric layer of a respective one of the end cups in the surface thereof, the seal having overall a hollow cylindrical shape with plane ends and a smooth peripheral surface, and having operational characteristics such that it can be repeatedly compressed axially to high cyclic loadings without extrusion and so that on release at the end of each cycle of the compression force, the bush returns rapidly to its relaxed condition.

* * * * *